United States Patent
Saxegaard et al.

(10) Patent No.: US 9,466,955 B2
(45) Date of Patent: Oct. 11, 2016

(54) KNIFE SWITCH, A SWITCHING DEVICE COMPRISING A KNIFE SWITCH AND A SWITCHGEAR

(71) Applicant: ABB Schweiz AG, Baden (CH)

(72) Inventors: Magne Saxegaard, Porsgrunn (NO); Ståle Talmo, Skien (NO); Stanley Lohne, Porsgrunn (NO); Thor Endre, Skien (NO); Tom-Rune Bjortuft, Porsgrunn (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/780,450

(22) PCT Filed: Mar. 28, 2013

(86) PCT No.: PCT/EP2013/056736
§ 371 (c)(1),
(2) Date: Sep. 25, 2015

(87) PCT Pub. No.: WO2014/154286
PCT Pub. Date: Oct. 2, 2014

(65) Prior Publication Data
US 2016/0049775 A1   Feb. 18, 2016

(51) Int. Cl.
*H02B 13/035* (2006.01)
*H01H 1/44* (2006.01)
(Continued)

(52) U.S. Cl.
CPC ........... *H02B 13/0352* (2013.01); *H01H 1/44* (2013.01); *H01H 21/54* (2013.01); *H01H 33/24* (2013.01);
(Continued)

(58) Field of Classification Search
CPC ........ H01H 33/24; H01H 1/44; H01H 21/54; H02B 13/0352
USPC ......... 218/140; 200/254, 255, 256, 253, 258
See application file for complete search history.

(56) References Cited

U.S. PATENT DOCUMENTS 2,717,940 A * 9/1955 Fjellstedt ................. H01H 1/62
                                                    200/254
4,090,046 A * 5/1978 Faust ...................... H01H 27/06
                                                    200/15
(Continued)

FOREIGN PATENT DOCUMENTS

CN    1471208 A    1/2004
CN    1499687 A    5/2004
(Continued)

OTHER PUBLICATIONS

International Preliminary Report of Patentability Application No. PCT/EP2013/056736 Issued: Mar. 17, 2015 7 pages.
(Continued)

*Primary Examiner* — Renee Luebke
*Assistant Examiner* — William Bolton
(74) *Attorney, Agent, or Firm* — Whitmyer IP Group LLC (57) ABSTRACT

A knife switch including an operator device for moving a contact knife between a first open position and a second position in electrical contact with a contact element. A free end of the contact knife provided with a dynamic electric field control device including an electrically conductive element. A switching device including a two-position switch including an at least partly electrically conductive housing, a three-position switch including the knife switch for connecting the two-position switch to a first electric conductor, wherein the at least partially electrically conductive housing is connected to a second electric conductor. A switchgear including switching devices.

15 Claims, 9 Drawing Sheets

(51) Int. Cl.
  *H01H 33/24* (2006.01)
  *H01H 21/54* (2006.01)
  *H01H 31/00* (2006.01)
  *H01H 33/12* (2006.01)
  *H01H 33/666* (2006.01)

(52) U.S. Cl.
  CPC .......... *H01H 31/003* (2013.01); *H01H 33/122* (2013.01); *H01H 33/128* (2013.01); *H01H 33/6661* (2013.01); *H01H 2205/002* (2013.01)

(56) References Cited

U.S. PATENT DOCUMENTS

| | | | |
|---|---|---|---|
| 5,191,180 A | | 3/1993 | Kitamura et al. |
| 5,508,486 A | | 4/1996 | Spack et al. |
| 5,969,308 A | * | 10/1999 | Pever ............... H01H 1/42 200/15 |
| 6,313,416 B1 | * | 11/2001 | Abroy ............... H01H 1/42 200/15 |
| 6,510,046 B2 | | 1/2003 | Arioka et al. |
| 8,110,771 B2 | | 2/2012 | Takahashi et al. |
| 8,247,725 B2 | | 8/2012 | Morita et al. |

FOREIGN PATENT DOCUMENTS

| | | | |
|---|---|---|---|
| CN | 1815831 | A | 9/2006 |
| CN | 101128965 | A | 2/2008 |
| CN | 102986100 | A | 3/2013 |
| DE | 2301778 | A1 | 7/1974 |
| DE | 2408338 | A1 | 9/1975 |
| DE | 102005009207 | A1 | 8/2006 |
| EP | 0863525 | A2 | 9/1998 |
| EP | 1385243 | A2 | 1/2004 |
| EP | 2244275 | A1 | 10/2010 |
| FR | 2846802 | A1 | 5/2004 |
| GB | 968226 | A | 9/1964 |
| GB | 1088075 | A | 10/1967 |
| JP | 9185930 | | 7/1997 |
| JP | 2009193886 | A | 8/2009 |
| TW | 1280715 | B | 5/2007 |
| WO | 02080206 | A2 | 10/2002 |
| WO | 2011073452 | A1 | 6/2011 |
| WO | 2011147717 | A1 | 12/2011 |
| WO | 2011159248 | A1 | 12/2011 |
| WO | 2012171570 | A1 | 12/2012 |

OTHER PUBLICATIONS

International Search Report and Written Opinion of the International Searching Authority Application No. PCT/EP2013/056736 Completed: Dec. 18, 2013; Mailing Date: Jan. 7, 2014 10 pages.
Chinese Office Action Application No. 201380075182.2 Mailed: May 25, 2016 5 pages.

* cited by examiner

KNIFE SWITCH, A SWITCHING DEVICE COMPRISING A KNIFE SWITCH AND A SWITCHGEAR

FIELD OF THE INVENTION

The present invention relates to a knife switch and a switching device comprising a knife switch. The invention further relates to electric power distribution switchgear comprising switching devices.

BACKGROUND OF THE INVENTION

Switchgears used today for medium and/or high voltages, e.g. 1-1000 kV, such as 12, 24 or 36 kV, are usually gas insulated switchgears (GIS), where the used insulating fluid is Sulphur hexafluoride (SF6). The use of SF6 allows for a compact design of the switchgear, since SF6 has good properties when it concerns dielectric performance and thermal performance, in particular related to preventing and dealing with unwanted electric discharges, e.g. arcs, and heat dissipation.

However, SF6 is a fluorinated gas that has a high global warming potential (GWP) and therefore alternative solutions are searched for. At the same time, it is desirable to keep the compactness of present switchgears with SF6, even if utilising other insulation fluids with lesser dielectric performance.

Generally, prior art compact 3-phase switchgears used today for medium/high voltages AC power distribution systems comprise one to five modules inside a sealed encapsulation, and each module comprises three switching devices, one for each phase. The switching device often comprises a load break switch/circuit breaker connected to a first electric conductor coming into the encapsulation via an electric bushing. Further, it comprises a selector switch used for connecting or disconnecting the load break switch/circuit breaker to a second electric conductor such as a busbar connected to another module. The selector switch can comprise a knife switch that is movable between positions in which it is connected or disconnected to the busbar or ground or disconnected from both. A current path may then be provided from the first conductor to the second conductor, via the load break switch/circuit breaker and the selector switch.

The load break switch/circuit breaker is commonly a vacuum interrupter, and it is arranged to open the circuit when certain operating conditions occur. Afters such an interruption, the selector switch, which is a three-position switch, may be manually or automatically disconnected from the busbar and thus disconnecting the load break switch/circuit breaker from the busbar, either by being moved to an intermediate open position or a position in which it is connected to ground. The three-position switch is also capable of making a connection to earth (e.g. short circuiting the connection).

A switchgear is previously known from WO 2012/171570 comprising a switching device of the above described type. The vacuum breaker is mounted on an electrically conductive housing that houses a guiding member for operating the vacuum breaker. Part of the current path provided from the vacuum breaker to the conductor/busbar, via the selector switch, is also located in the housing. A compact switchgear is obtained and it is mentioned that it may possibly be used with air as an insulation gas.

A similar switchgear and switching device is also previously known from WO 2011/073452.

However, it is desirable to obtain alternative solutions in order to obtain compact gas insulated switchgear that are more environmentally friendly.

SUMMARY OF THE INVENTION

An object of the present invention is to provide an improved compact knife switch that may be used in narrow spaces and when having difficult electric field conditions. A further object is to provide a knife switch, which is suitable to use in a switching device for a medium and/or high voltage switchgear. Another object is to provide a compact gas insulated switchgear (GIS) that makes it possible to use an insulation fluid with a lower GWP than SF6, and which is preferably also so compact that it is essentially equal in space requirement to an SF6 GIS.

The above objects are achieved by the present invention.

Accordingly is defined a knife switch comprising a hinged contact knife, moveable between at least two positions, and a first electric contact element, said contact knife being made of an electrically conductive material and being electrically connectable at a first end to a first electric conductor, said first electric contact element being made of an electrically conductive material, and further comprising an operator device for moving said contact knife between the at least two positions, of which a first position is an open position in which a second free end of the contact knife is disconnected from any electrical contact, and a second position is a first contact position in which the second free end of the contact knife is in electrical contact with the first electric contact element. The knife switch is characterised in that the second free end of the contact knife comprises two knife blades adjacent to each other and that each knife blade is provided with a dynamic electric field control device comprising an electrically conductive element. The provision of the dynamic electric field control device offers the advantage that the electric field that is usually present and particularly strong around the tip of the knife blade, due to its geometry, can be controlled to be more evenly distributed and balanced such that the risk of involuntary electric discharges is reduced when the switch is in its open position. Since the risk for involuntary discharges is also dependent on the distance between the electrically conducting parts, a reduced risk means that the distance between the parts can be diminished and the knife switch can be made more compact all together.

According to one feature, each knife blade is configured with inwards facing electric contact surface facing a corresponding electric contact surface of the other knife blade, said contact surfaces being configured for electric contact with the first electric contact element, and each knife blade having an outwards facing dynamic electric field control device.

According to the invention, the electrically conductive element has an at least partly rounded shape. With this rounded shape is obtained a surface that will contribute to distributing the electric field more evenly field evenly and reduce the risk for electric discharges. The shape may for example be a sphere, oval, elliptical, egg-shaped or having at least a part that has one or more of these forms.

The dynamic field control devices with the electrically conductive elements can be attached to the contact knife in many different ways, e.g. by screws, by gluing, by some snap on device, etc.

The first electric contact element of the knife switch may be connected to ground. A connection to ground is useful in a situation when it is desired to test a cable connected to the knife switch and constituting said first electric conductor.

According to one embodiment, the hinged contact knife of the knife switch may comprise a first electrically conductive part connected to the first electric conductor, and a second electrically conductive part articulately connected to the first electrically conductive part and which second electrically conductive part is moveable between said first and second positions, and an optional third position, by means of the operator device. By dividing the contact knife into two parts connected by a hinge, less space is required.

To continue, the knife switch may comprise guiding means for said first electrically conductive part of the contact knife, which guiding means comprises an insulator bar provided with at least one through-hole through which said first electrically conductive part is inserted, and wherein at least one opening of said through-hole is recessed in the insulator bar.

It is well known that triple points, i.e. points where materials or substances having different electric conductivity meet, are points where the dielectric strength is compromised. In the present case, triple points occur e.g. where the insulating material in the insulator bar, the electrically conducting material of the knife, and the insulation gas come into contact at the opening in the insulator bar where the contact knife enters the through-hole. In order to mitigate the effect of the triple points, the openings are recessed into the bar and thereby hidden.

The insulator bar may further be provided with transverse ribs configured to prevent creeping currents.

The insulator bar may also be provided with a support device for supporting the first electric contact element and the support device may optionally be provided with transverse ribs configured to prevent creeping currents.

According to another feature, the hinged contact knife is moveable between three positions by means of the operator device, wherein a third position is a second contact position in which the second free end of the contact knife is in electrical contact with a second electric contact element being made of an electrically conductive material. Thus a three position switch is obtained having a very compact design and all of the above described advantages.

Also the second electric contact element may be provided with dynamic electric field control devices on externally facing sides thereof, thus providing the corresponding advantages as described in connection with the contact knife. The respective dynamic electric field control device of the second electric contact element may also comprise an electrically conductive element that has an at least partly rounded shape.

In addition to the above, the contact surfaces of the contact knife, as well as the other electric contact surfaces, may be at least partially silver plated in order to promote electric contact.

All of the mentioned dynamic field control devices comprises an electrically conductive element that is made of an electrically conductive material or at least it has a surface that is electrically conductive in order to provide the electrically conductive element. For example, it may be made of copper, aluminium or plastic with an electrically conductive coating. With regard to the knife switch, preferably the electric field control device is light-weight in order for the knife switch to be able to move swiftly without any inertia of the electric field control device affecting the movement. Such a light-weight electric field control device may be obtained by making it hollow.

According to another aspect of the invention is defined a switching device for electric power distribution switchgear, comprising a two position switch mounted to an at least partly electrically conductive housing, a three-position switch for connecting the two position switch to a first electric conductor, wherein the at least partially electrically conductive housing is connected to a second electric conductor, wherein the three-position switch is a knife switch according to any one of claims defining a three position knife switch, configured to be able to move between a first position which is an open position in which the second free end of the contact knife is disconnected from any electrical contact, a second position which is a first contact position in which it connects the first electric conductor to the first electric contact element which is connected to ground, and a third position which is a second contact position in which it provides electric connection between the first electric conductor and the two position switch comprising said second electric contact element, wherein a current path is provided between the first electric conductor and the second electric conductor, via the three-position switch, the two position switch, and the housing.

By using the knife switch of the present invention as a three position selector switch and placing it under a two position switch, which can be a vacuum switch functioning as a circuit breaker, the advantage is achieved that connection to ground can be made by the knife switch, and one can avoid having the connection to ground above the circuit breaker that is the vacuum switch and thus avoid grounding through the vacuum switch. This advantage will be further described in connection with the description of the switchgear.

Another advantage is that a connection to ground is useful in a situation when it is desired to test a cable connected to the knife switch and constituting said first electric conductor. As a safety measure, the three position switch is moved to ground before the cable is tested.

According to another aspect of the present invention is defined an electric power distribution switchgear, comprising a sealed gas tight encapsulation inside which is located at least one three-phase module comprising a switching device according to the present invention, for each one of said three phases. The switching device with the knife switch having the described arrangements for dynamic electric field control that allows for a compact design, will also make it possible to build a switchgear of a more compact design while at the same time it will be possible to use another insulation gas than SF6 which gas has not as good dielectric performance but a more favourable GWP. Thus, the sealed encapsulation may be filled with a gas that has a GWP of less than 150. For example it can be mentioned that air has a GWP of 1. According to a feature of the present invention, the sealed encapsulation may be filled with a gas that is dry air, or a gas that comprises air mixed with another gas.

To summarise, the present invention provides a dielectric design of knife switch and switching devices that offers the possibility of obtaining a switchgear that can use an insulation fluid other than SF6, which insulation fluid has a much lower GWP, of less than 150, preferably less than 100, and even less, and which switchgear is very compact. In fact it may be as compact as a regular SF6 gas insulated switchgear. This is possible by using an overall concept for obtaining dynamic shielding and harmonic electric field distribution, no sharp edges, neutralisation of triple points, surface finish etc.

Further features and advantages of the invention will also become apparent from the following detailed description of embodiments.

BRIEF DESCRIPTION OF THE DRAWINGS

A detailed description of the present invention and embodiments thereof, given as examples only, will now be made with reference to the accompanying drawings, in which.

In the drawings, the same reference numbers have been given to details that are the same or correspond in the different embodiments.

DETAILED DESCRIPTION OF THE INVENTION

Figure 1A:
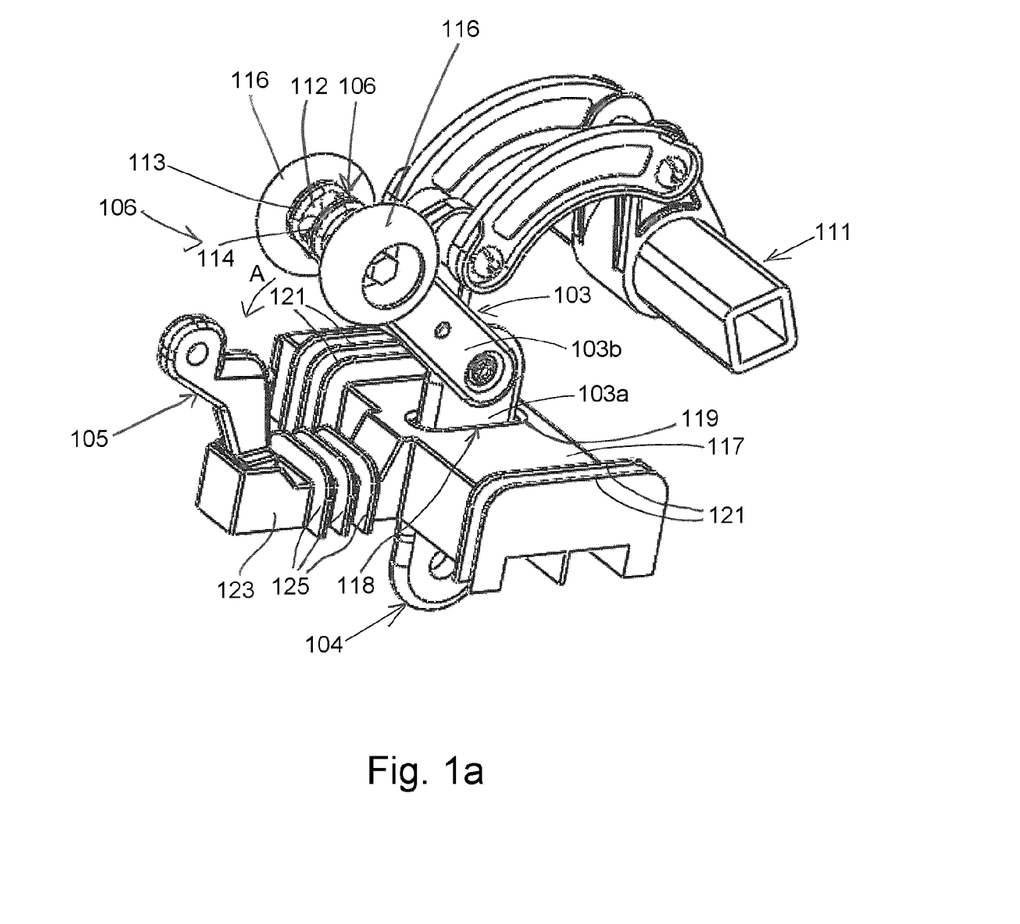
FIGS. 1a and 1b show schematically an embodiment of a two position knife switch, according to the present invention.
Figure 1B:
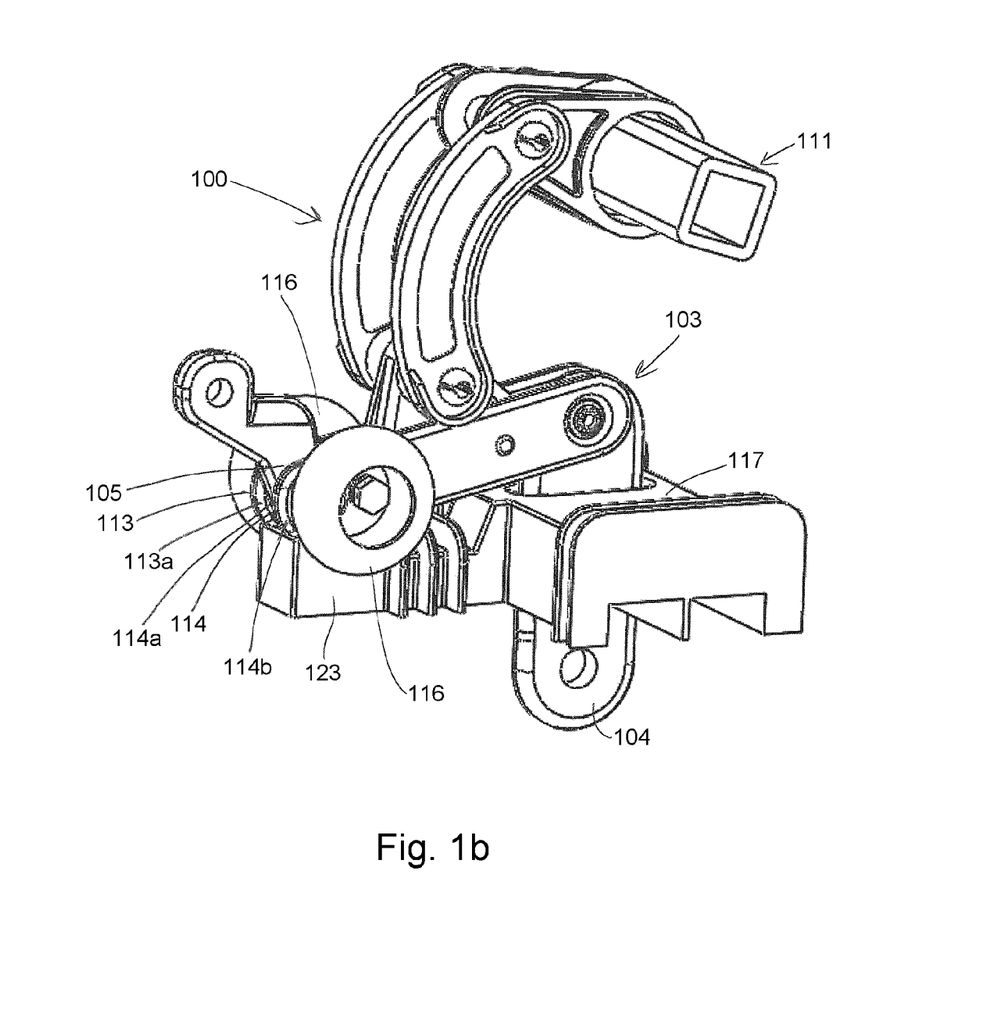

In FIGS. 1a and 1b is shown an embodiment of a knife switch 100 according to the present invention. The knife switch comprises a hinged contact knife 103 made of an electrically conductive material, and a first electric contact element 105 made of an electrically conductive material, such as aluminium, copper, iron, zinc. The contact knife 103 has a first end 104 and a second end 106. The contact knife is electrically connectable to a first electric conductor 109, by means of its first end 104, see also FIGS. 4 and 5. The knife switch further comprises an operator device 111, by means of which the hinged contact knife 103 may be moved, and in particular its second moveable end 106, as illustrated by the arrow A, between a first position as illustrated in FIG. 1a, and a second position as shown in FIG. 1b. The first position is an open position and the second end 106 of the contact knife is free and disconnected from any electrical contact. The second position is a contact position, in which the second end 106 of the contact knife will be in electric contact with said first contact element 105, which in turn is connected to ground. The second position will be referred to as a first contact position.

The second end 106 of the hinged contact knife 103 comprises two knife blades 113, 114. These knife blades are parallel and adjacent each other. When the knife switch is in the first contact position, the contact element 105 is located in a slot 112 provided between the knife blades 113, 114, at the second end 106 of the knife switch 103. This is shown in FIG. 1b. Thus the respective knife blade has an inwards facing electric contact surface 113a, 114a, at its inwards facing ends, which is facing the corresponding electric contact surface of the other knife blade. Optionally these contact surfaces may be silver-plated in order to improve electric contact. On the outwards facing ends 113b, 114b of the respective knife blade, i.e. facing away from each other, each knife blade is provided with a dynamic electric field control device 116. The function of the dynamic electric field control device is to provide dynamic shielding, in particular of the outer tips on the contact knife, and obtain good dielectrical strength when the knife switch is in its open position.

Figure 3A:
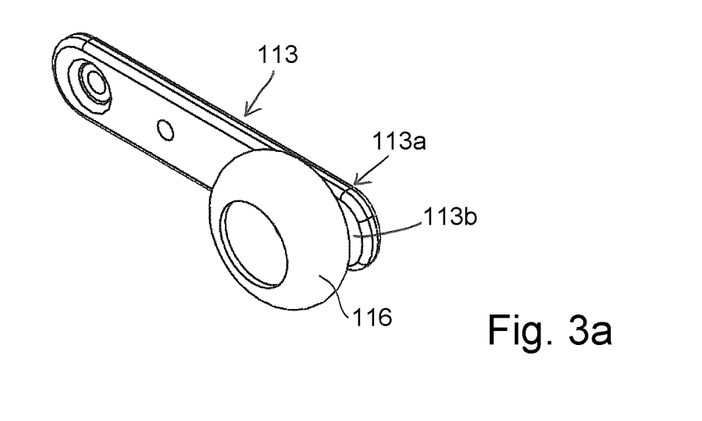
FIGS. 3a-3c shows schematically embodiments of a knife blade of a knife switch according to the present invention.
Figures 3B, 3C:
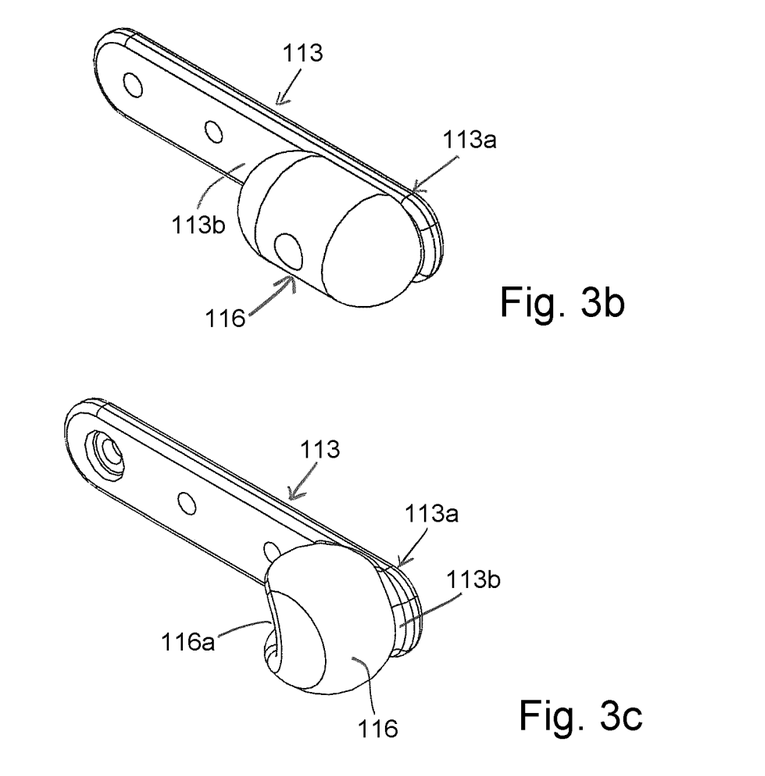

Examples of embodiments of a knife blade 113 provided with a dynamic electric field control device 116 is shown in more detail in FIGS. 3a-3c. The dynamic electric field control device 116 comprises an electrically conductive element. The dynamic field control device may itself be made of an electrically conductive material thus constituting the electrically conductive element, or it may be made of another material and only have a surface made of an electrically conductive material which surface would then form the electrically conductive element. For example, it may be made of copper, aluminium or plastic with an electrically conductive coating. This electrically conductive element preferably has an at least partly rounded shape. In order to control the dynamic electric field and reduce is effects, any type of rounded shape is preferred that would contribute to a more harmonic and even electric field distribution. As shown in the embodiment in FIG. 3a, the electric field control device with the electrically conductive element may have the shape of a wheel, with a hollow interior. FIG. 3b shows another embodiment according to which it has an elongated shape with ends formed as part of spheres, e.g. half spheres. In the embodiment shown in FIG. 3c, the electric field control device with the electrically conductive element is essentially shaped as a sphere but with one or more cut out parts or recesses 117.

Figure 2A:
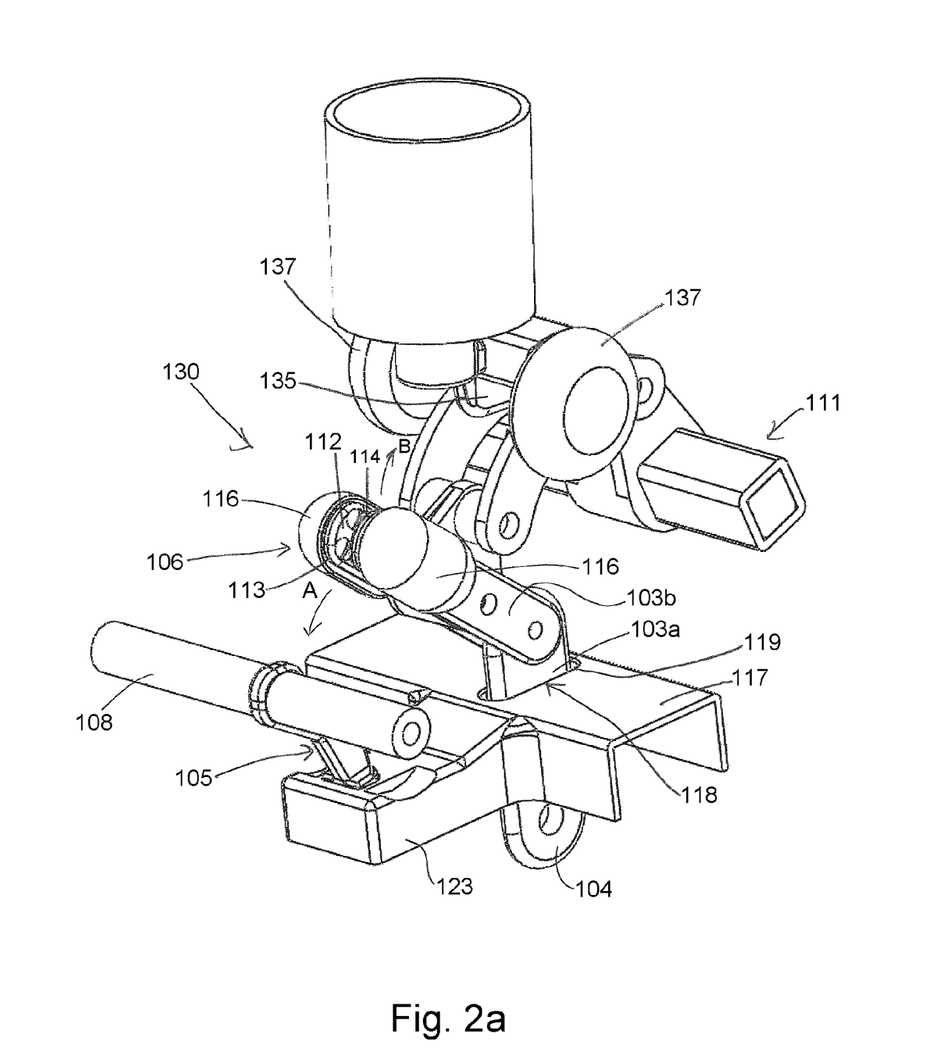
FIGS. 2a-2c show schematically an embodiment of a three position knife switch, according to the present invention.
Figure 2B:
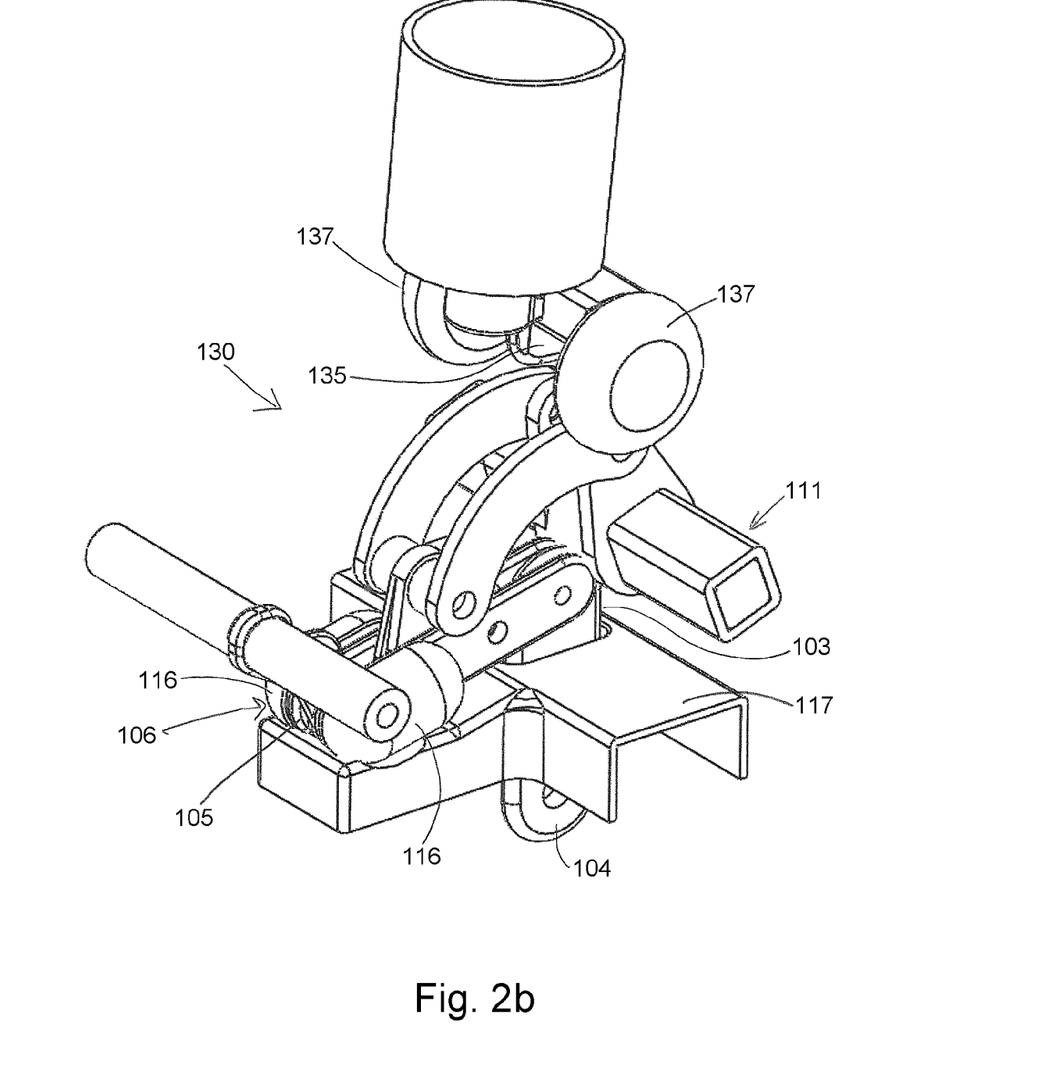
Figure 2C:
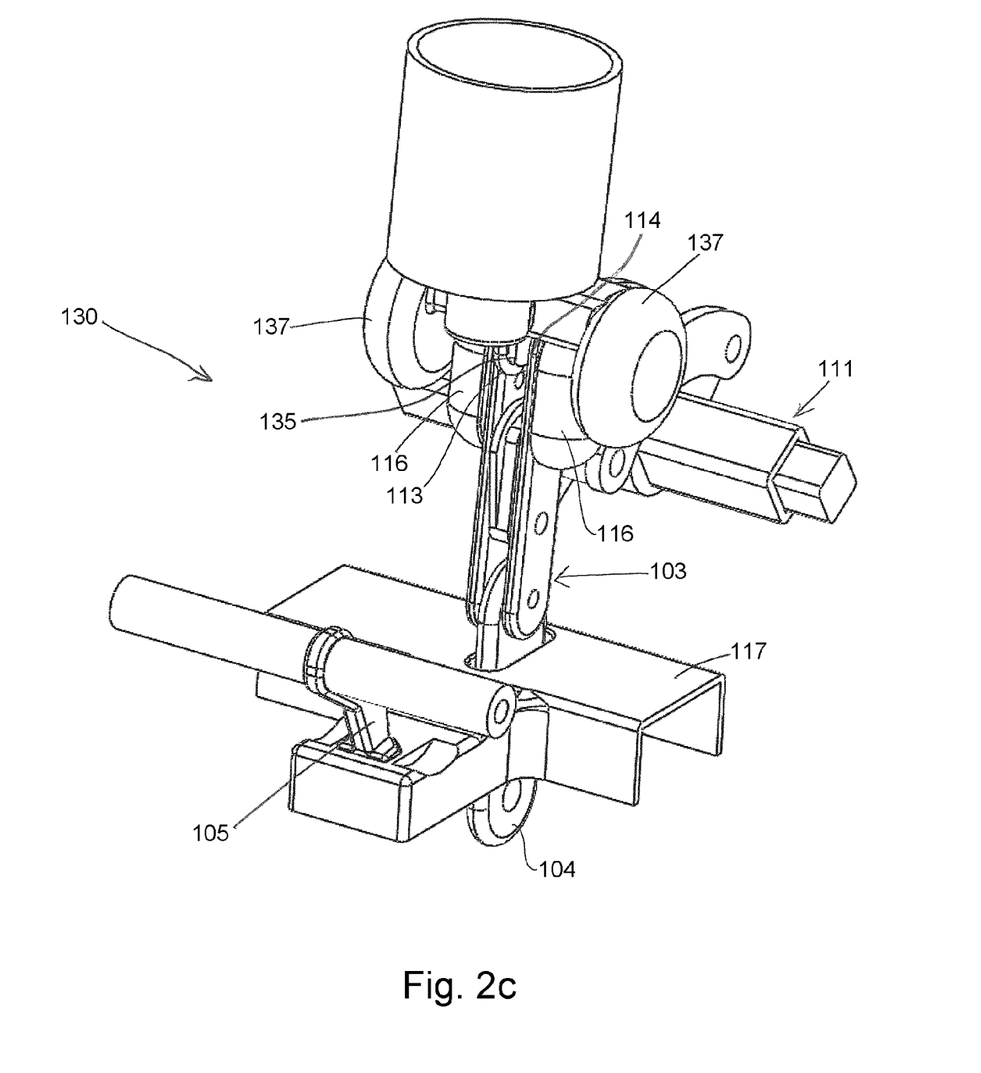

In FIGS. 2a-2c is shown a three position knife switch 130 according to the present invention. This switch has a first position, which is an open position as illustrated in FIG. 2a, and a second position, which is a first contact position as illustrated in FIG. 2b, in analogy with the two positions described above in relation to the two position knife switch of FIGS. 1a and 1b. In addition, this knife switch is moveable to a third position, which is an additional second contact position as illustrated in FIG. 2c. The movement to the third position is illustrated by the arrow B in FIG. 2a. The three position knife switch 130 further has the same elements as the two position knife switch of FIGS. 1a-1b and these elements have been given the same reference numbers. In addition, the knife switch 130 has a second electric contact element 135 made of an electrically conductive material. Optionally, this electric contact element may be silver plated in order to enhance electric contact. This second contact element 135 is further connected to a second electric conductor (not shown). The first contact element 105 is connected to ground. This may for example be achieved by means of a ground connection bar 108 that e.g. is connected to a housing in which the knife switch is located. In the illustrated embodiment, the first electric contact element 105 is located below the ground bar 108, which is advantageous since the electrical forces in this configuration works to force the contact knife down towards the first electric contact element 105, once the contact knife has passed the ground bar 108. Further, the knife blades 113, 114 of the contact knives are provided with dynamic electric field control devices 116, which may have any one of the configurations described and discussed in relation to FIGS. 3a-3c. Thus the design of the dynamic field devices is not in any way limited to the design shown in FIGS. 3a-3c.

Also the second electric contact element 135 may optionally be provided with dynamic electric field control devices 137 in its vicinity. Examples of such dynamic electric field control devices 137 are shown in the illustrated embodiment of a three position knife switch. They are illustrated as having a partly spherical shape, but also other shapes are possible in analogy with what has been discussed above in relation to the dynamic electric field control devices on the knife blades. There is a small gap between each one of the dynamic electric field devices 137 and the electric contact element 135 in order to make room for the ends of the knife blades with their respective field control devices 116, when the knife switch reaches its third position and the knife blades 113, 114 enters into contact with the second electric contact element 135.

Figure 2D:
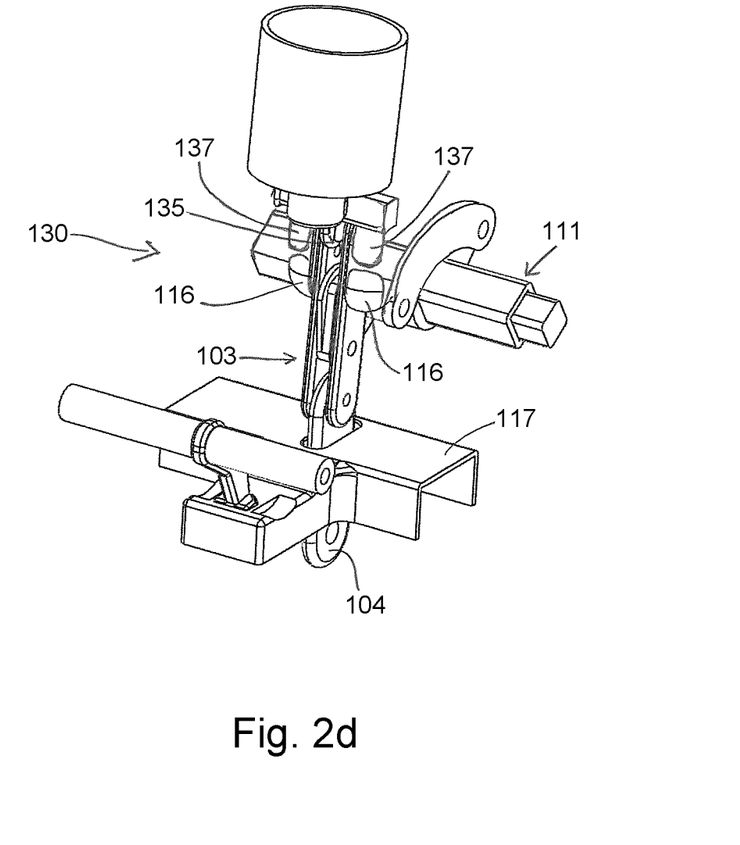
FIG. 2d shows a variant of a three position knife switch according to the present invention.

In FIG. 2d is illustrated a variant of the three position switch showing alternative configurations of the field control devices on the contact knives and the field control devices of the second contact. The switch is shown in the third position where the contact knife 103 is in contact with the second electric contact element 135. As can be seen, the field control devices 116 of the contact knife are arranged such that they are located as a prolongation of the field control devices 137 of the second electric contact element, when the knife switch is in its third contact position. This is a very compact design.

The hinged contact knife in any one of the illustrated knife switches, comprises two parts 103a, 103b that are connected to each other by a hinge, namely a first electrically conductive part 103a that is connected to the first electric conductor 109, and a second electrically conductive part 103b that is moveable between said first and second position, and optionally a third position, as shown in FIGS. 1a-1b and 2a-2c. Alternatively, it is conceivable that the hinge function of the hinged contact knife may be provided by a hinge arranged directly at its first end 104, where it is connected to the first electrical conductor 109.

The knife switch further comprises guiding means for said first electrically conductive part 103a of the contact knife in the form of an insulator bar 117 made of an insulating material, see FIGS. 1a-1b, 2a-2c. The insulator bar 117 is secured to some kind of support structure, not shown, and it is provided with at least one through-hole 118, through which the first part 103a of the knife switch is inserted, by its end 104, such that the end 104 protrudes on the backside of the insulator bar where it can be connected to the first electrical conductor 109. The opening 119 leading into the through-hole on the upper side of the insulator bar 118 is recessed. The reason for this is that, in a gas insulated switchgear, triple points would occur e.g. where the insulating material in the insulator bar, the electrically conducting material of the knife, and the insulation gas come into contact with each other. Such a triple point would occur at the opening in the insulator bar where the contact knife enters the through-hole. In order to reduce the effect of the triple points, which cause a disadvantageous electric field distribution, the openings are recessed into the bar and thereby the triple points are hidden. Preferably, the through-hole openings on both sides of the insulator bar are recessed.

Further, the insulator bar 118 may optionally be provided with one or more transverse ribs 121 having the function of preventing creeping currents. These ribs are preferably on the upper side of the insulator bar, i.e. on the side facing the movable part 103b of the contact knife, but the ribs may also continue along the vertical sides of the insulator bar. The ribs are preferably located on respective sides of the through-hole for the contact knife.

The insulator bar 117 also comprises a support device 123 for the first electric contact 105. In the illustrated embodiments, this support device is simply configured as an arm protruding from the insulator bar. This support device may also comprise creep preventing means in the shape of one or more transverse ribs 125 between the insulator bar and the first electric contact element 105.

The operator device 111 for the knife switch 100, 130 is only schematically illustrated as a square shaft, as an example only. The movement between the different positions is made by turning this square shaft, e.g. by some sort of handle or any other suitable control device known per se and which is not shown. The operator device may comprise other arrangements as alternatives to the square shaft and handle/control device. The operator device may be operated manually or by some automatic arrangement.

Figure 4:
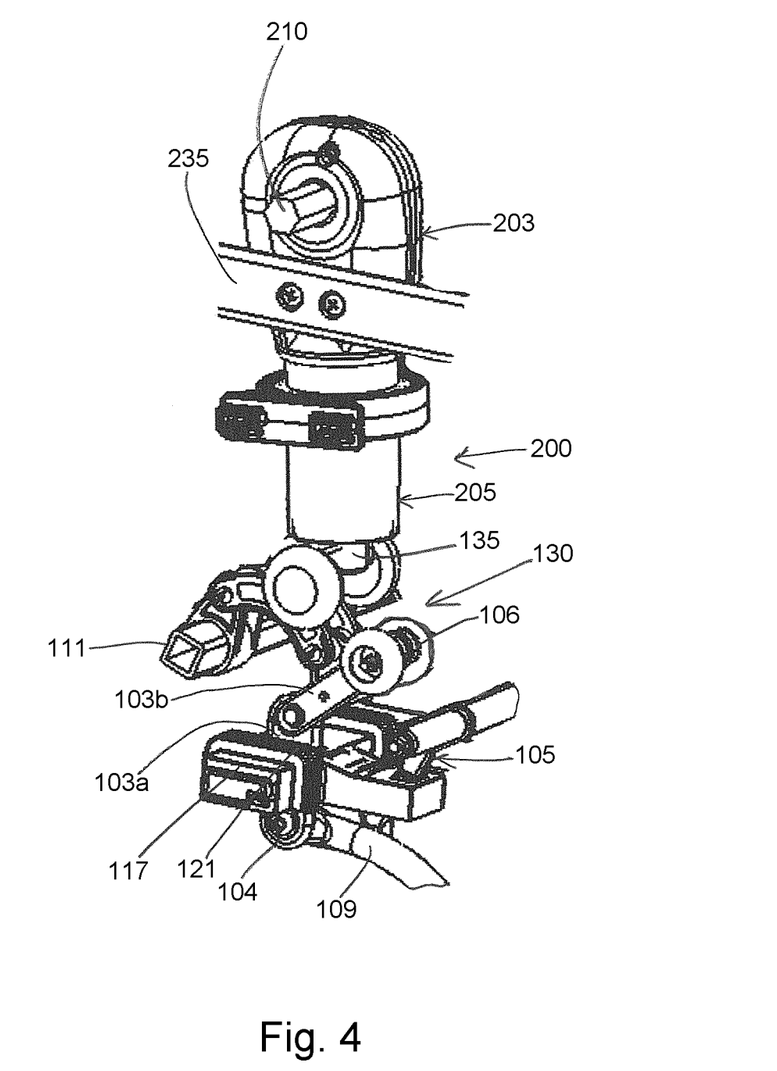
FIG. 4 shows schematically an embodiment of a switching device according to the present invention.

In FIG. 4 is schematically illustrated an example of a switching device 200 according to the present invention. The switching device comprises a three-position switch 130 in accordance with the three-position knife switch described above in connection with FIGS. 2a-2c, but with another variant when it comes to the design of the dynamic field control devices on the contact knife corresponding to the design shown in FIG. 3a. The knife switch is connected to a first electric conductor 109. The knife switch is, as previously described, arranged to make contact with the second electric contact element 135, which in the illustrated switching device is connected to a two position switch that is a vacuum switch 205 mounted to an at least partly conductive housing 203, often referred to as a pole house. From the housing is provided an electric connection to a second electric conductor 235. This conductor may be a busbar if the switching device is part of a multi-module switchgear. The vacuum switch can be of a previously known type, e.g. a spring loaded switch that is manually or automatically operated by means of an operator device 210 that may be similar to the operator device 111. The vacuum switch includes in a conventional way an electrically conductive first contact (not shown) that is electrically connected to a first terminal, which in the present case would be the second electric contact element 135, and an electrically conductive second contact (not shown) that is electrically connected to a second terminal located in the housing 203, and which is electrically connected to the second electric conductor 235. The second contact and the second terminal are movable, by means of the operator device 210, in relation to the first contact and the housing. When the first and second contacts are in contact the vacuum switch is in a closed position and when they are not in contact the vacuum switch is in an open position.

In the switching device 200, the knife switch 130 can move between a first position which is an open position and in which the second free end 106 of the contact knife 103 is disconnected from any electrical contact, a second position which is a first contact position in which it connects the first electric conductor 109 to the first electric contact element 105 which is connected to ground, and a third position which is a second contact position in which it provides electric connection between the first electric conductor 109 and the vacuum switch 205 comprising said second electric contact element 135, wherein a current path is provided between the first electric conductor 109 and the second electric conductor 235, via the three-position switch 120, the two position vacuum switch 205, and the housing 203.

Figure 5:
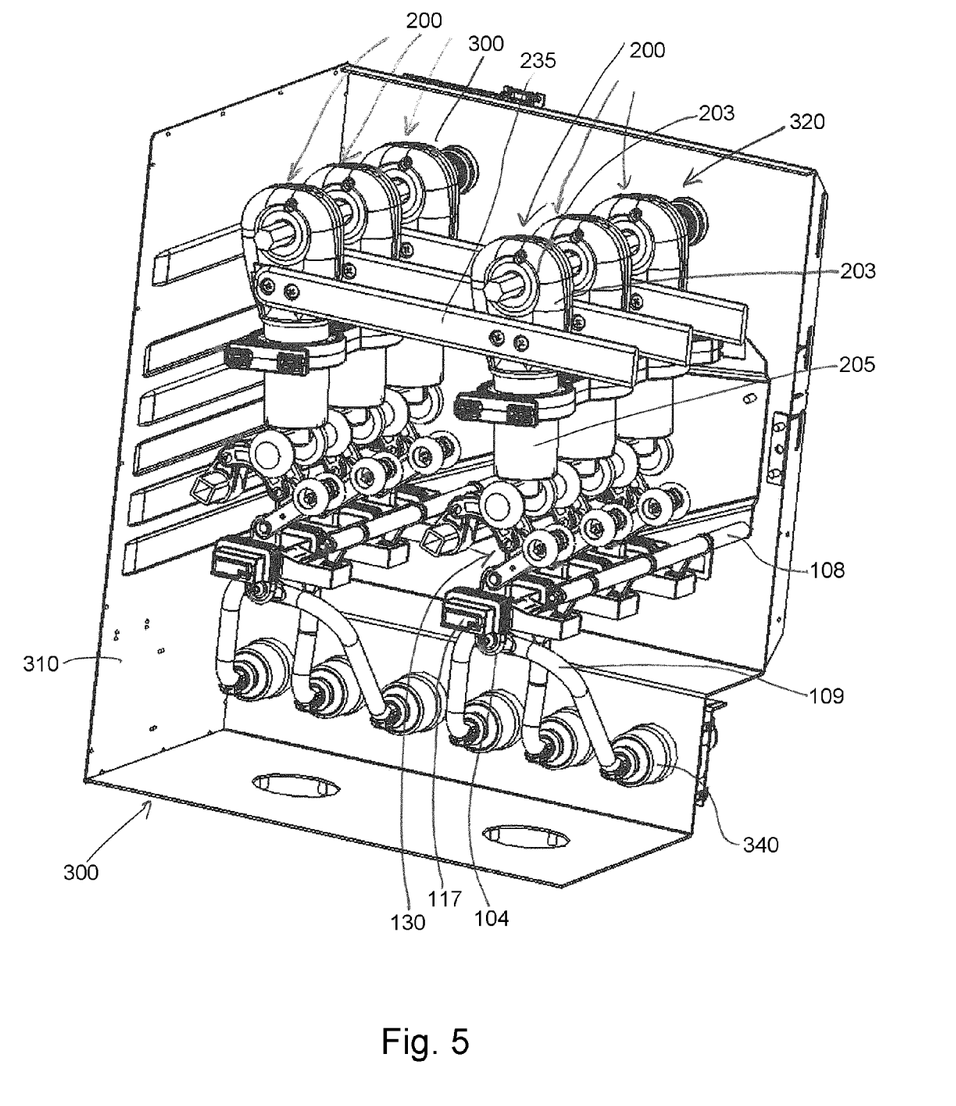
FIG. 5 shows schematically an embodiment of a switchgear according to the present invention.

In FIG. 5 is shown an example of an application of the present invention in a switching device 200 used in a switchgear 300 for a three phase AC electric power distribution system. The illustrated example is a switchgear comprising two modules 310, 320 and each module comprises three poles/phases. Every phase is provided with a switching device 200 according to the invention. Other switchgears are foreseen that can include between one and up to five modules, or even more. However, it should be noted that it is not necessarily required that all of the modules have switching devices according to the invention. In the illustrated example, the knife switches 130 of the switching devices are shown in an open position.

The switchgear 300 comprises a sealed encapsulation inside which the three-phase modules 320, 330 are located. Each one of the switching devices 200 is connected to a first conductor 109 that enters the encapsulation 310 via an electric bushing 340. Each phase of one module is connected to the corresponding phase of the other module by means of a second conductor 235 or busbar. For a switchgear comprising more than the illustrated two modules, the phases of the additional module/modules would also be connected via the conductor 235 as schematically shown in FIG. 5. The sealed encapsulation is gas tight and filled with an insulating gas, and preferably a gas that has a GWP of less than 150.

The invention shall not be considered limited to the illustrated embodiments, but can be modified and altered in many ways, as realised by a person skilled in the art, without departing from the scope defined in the appended claims.

The invention claimed is:

1. A knife switch comprising a hinged contact knife, moveable between at least two positions, and a first electric contact element, said contact knife being made of an electrically conductive material and being electrically connectable at a first end to a first electric conductor, said first electric contact element being made of an electrically conductive material, and further comprising an operator device for moving said contact knife between the at least two positions, of which a first position is an open position in which a second free end of the contact knife is disconnected from any electrical contact, and a second position is a first contact position in which the second free end of the contact knife is in electrical contact with the first electric contact element, characterized in that the second free end of the contact knife comprises two knife blades adjacent to each other and that each knife blade is provided with a dynamic electric field control device comprising an electrically conductive element, and that the electrically conductive element has an at least partly spherical shape.

2. The knife switch according to claim 1, characterized in that each knife blade has an inwards facing electric contact surface facing a corresponding electric contact surface of the other knife blade, said contact surfaces being configured for electric contact with the first electric contact element, and each knife blade having an outwards facing dynamic electric field control device.

3. The knife switch according to claim 1, characterized in that the first electric contact element is connected to ground.

4. The knife switch according to claim 1, characterized in that the hinged contact knife comprises a first electrically conductive part connected to the first electric conductor, and a second electrically conductive part articulately connected to the first electrically conductive part and which second electrically conductive part is moveable between said first and second positions, and an optional third position, by means of the operator device.

5. The knife switch according to claim 4, characterized in that it comprises guiding means for said first electrically conductive part of the contact knife, which guiding means comprises an insulator bar provided with at least one through-hole through which said first electrically conductive part is inserted, and wherein at least one opening of the through-hole is recessed in the insulator bar.

6. The knife switch according to claim 5, characterized in that the insulator bar is provided with transverse ribs configured to prevent creeping currents.

7. The knife switch according to claim 5, characterized in that the insulator bar is provided with a support device for supporting the first electric contact element and that the support device is optionally provided with transverse ribs configured to prevent creeping currents.

8. The knife switch according to claim 1, characterized in that the hinged contact knife is moveable between three positions by means of the operator device, that a third position is a second contact position in which the second free end of the contact knife is in electrical contact with a second electric contact element being made of an electrically conductive material.

9. The knife switch according to claim 8, characterized in that the second electric contact element is provided with dynamic electric field control devices on externally facing sides thereof.

10. The knife switch according to claim 9, characterized in that the respective dynamic electric field control device of the second electric contact element comprises an electrically conductive element that has an at least partly rounded shape.

11. The knife switch according to claim 8, characterized in that electric contact surfaces of the second electric contact element and the contact knife are silver plated.

12. A switching device for electric power distribution switchgear, comprising a two-position switch comprising an at least partly electrically conductive housing,
a three-position switch for connecting the two-position switch to a first electric conductor,
wherein the at least partially electrically conductive housing is connected to a second electric conductor,
wherein the three-position switch is a knife switch according to claim 8, configured to be able to move between a first position which is an open position in which the second free end of the contact knife is disconnected from any electrical contact, a second position which is a first contact position in which it connects the first electric conductor to the first electric contact element which is connected to ground, and a third position which is a second contact position in which it provides electric connection between the first electric conductor and the two-position switch comprising said second electric contact element, wherein a current path is provided between the first electric conductor and the second electric conductor, via the three-position switch, the two-position switch, and the housing.

13. An electric power distribution switchgear, comprising a sealed gas tight encapsulation inside which is located at least one three-phase module comprising a switching device as defined in claim 12 for each one of said three phases.

14. The electric power distribution switchgear according to claim 13, wherein the sealed encapsulation is filled with a gas that has a GWP of less than 150.

15. The electric power distribution switchgear according to claim 14, wherein the sealed encapsulation is filled with a gas that is dry air, or a gas that comprises air mixed with another gas.

* * * * *